United States Patent [19]
Jones et al.

[11] Patent Number: 6,151,655
[45] Date of Patent: *Nov. 21, 2000

[54] COMPUTER SYSTEM DEADLOCK REQUEST RESOLUTION USING TIMED PULSES

[75] Inventors: Christine Comins Jones; Pak-kin Mak, both of Poughkeepsie; Michael A. Blake, Wappingers Falls; Michael Fee, Cold Springs; Gary Eugene Strait, Poughkeepsie, all of N.Y.

[73] Assignee: International Business Machines Corporation, Armonk, N.Y.

[ * ] Notice: This patent is subject to a terminal disclaimer.

[21] Appl. No.: 09/070,432

[22] Filed: Apr. 30, 1998

[51] Int. Cl.[7] .................................................... G06F 12/00
[52] U.S. Cl. .............................. 710/244; 710/40; 711/151
[58] Field of Search ...................... 710/36–50, 107–125, 710/240–244; 711/147–153

[56] References Cited

U.S. PATENT DOCUMENTS

| | | | |
|---|---|---|---|
| 4,937,733 | 6/1990 | Gillett, Jr. et al. | 710/108 |
| 5,016,167 | 5/1991 | Nguyen et al. | 711/151 |
| 5,025,370 | 6/1991 | Koegel et al. | 710/241 |

OTHER PUBLICATIONS

"Precise Method to Prevent Lockout in an Input/Output Priority Queueing System" IBM Technical Disclosure Bulletin, vol. 39, No. 12, Dec. 1996, pp. 117–118.

"Low Cost Multiple Hang Timers" IBM Technical Disclosure Bulletin, vol. 31, No. 8, Jan. 1989.

"Detection of Element/System Timeouts" IBM Technical Disclosure Bulletin, Jul. 1990, No. 315.

"Prevention of Low Priority Lockout" IBM Technical Disclosure Bulletin, Feb. 1987, No. 274.

*Primary Examiner*—Glenn A. Auve
*Assistant Examiner*—Sumati Lefkowitz
*Attorney, Agent, or Firm*—Lynn L. Augspurger

[57] ABSTRACT

Disclosed is a hardware mechanism for detecting and avoiding potential deadlocks among requestors in a multiprocessor system, consisting of a plurality of CP's and I/O adapters connected to one or more shared storage controllers (SC's). Requests to each storage controller originate from external sources such as the CP's, the I/O adapters, and the other SC, as well as from internal sources, such as the hardware facilities used to process fetches and stores between the SC and main memory. All requests must be granted priority before beginning to execute, using a ranked priority order scheme. Specific sequences of requests may cause deadlocks, either due to high-priority requests using priority cycles and locking out low-priority requests, or as a result of requests of any priority level busying resources needed for the completion of other requests. The deadlock resolution mechanism described here monitors the length of time a request has been valid in the storage controller without completing, by checking the request register valid bits and utilizing a timed pulse, which is a subset of the pulse used to detect hangs within the SC. If the valid bit for a request register is on, and two timed pulses are received, an internal hang detect latch is set. If the valid bit is reset at any time, the detection logic and the internal hang detect latch are reset. When the internal hang detect latch is set, requests in progress are allowed to complete, and new requests are held in an inactive state, until the request which detected the internal hang is able to complete.

28 Claims, 6 Drawing Sheets

COMPUTER SYSTEM DEADLOCK REQUEST RESOLUTION USING TIMED PULSES

CROSS REFERENCE TO RELATED APPLICATIONS

The present application related to the following co-pending patent application filed concurrently herewith:

"Method for deadlock resolution", filed Apr. 30, 1998, under U.S. Ser. No. 09/070,664.

This co-pending application and the present application are owned by one and the same assignee, International Business Machines Corporation of Armonk, N.Y.

FIELD OF THE INVENTION

This invention is related to computers and computer systems, and in particular to mechanisms for preventing deadlocks between a plurality of request types competing for access to the same resources in a multiprocessor system.

BACKGROUND OF THE INVENTION

In a multiprocessor system with a plurality of central processors (CP's) connected to a common storage controller (SC), multiple requestors may be attempting to access the resources controlled by the SC in a given cycle. The SC controls access to common storage, in the form of a store-in level 2 (L2) cache. The SC also controls access to main memory. Both the L2 cache and the main memory are divided into independent sections known as interleaves to allow concurrent access by multiple requests.

In an IBM multiprocessor system under development, requests may originate from sources external to the SC, namely the CP's, the I/O adapters, and, in the case of a system consisting of multiple CP/SC units, another SC. Requests may also originate from logic stations internal to the SC, specifically, the logic which processes fetch requests from the SC to the main memory and the logic which processes stores from the SC to the main memory.

There are two processing pipelines within the SC. Requests must be granted priority before they can be gated into one of the pipelines to begin executing. In most cases, a request will complete its execution after a single pass through the pipeline. In other cases, a request will have its processing interrupted for some reason, and will have to make additional pipeline passes. Priority must be granted for each pipeline pass.

Each SC is attached to six CP's, which originate fetch and store requests to the SC. Each CP contains a store-through level 1 (L1) cache, which results in a large amount of store traffic being sent from the CP to the SC's store-in L2 cache. CP store requests target a specific pipeline within the SC, while fetch requests may target either pipeline. The SC contains one dedicated fetch request register for each CP, and two stacks per CP for store requests, one per pipeline, each of which can hold up to eight store requests. The oldest store for a given CP must always be processed first, so only one store per CP per pipeline can be valid for priority. Thus, there can be up to twelve CP requests (six fetches, six stores) competing for access to one pipeline within the SC in a given cycle.

There are two I/O adapters attached to each SC, which can also send both fetch and store requests. There are four dedicated I/O request registers in the SC for each pipeline, two per I/O adapter, which can be used for either type of request. This can result in four I/O requests competing for priority for a given pipeline in the same cycle.

Requests from the remote SC may be fetch or store commands. For each pipeline, there are four remote request registers in the SC, two dedicated to fetches and two dedicated to stores. Thus, there can be four remote requests competing for access to one pipeline in the same cycle.

Fetch requests from the SC to the main memory are processed by the hardware facilities known as the line fetch address registers (LFAR's). There are four of these per pipeline, all of which can be making requests simultaneously. Similarly, there are hardware facilities to handle the stores from the SC to the main memory necessitated by the store-in design of the L2 cache. These are the line store address registers (LSAR's). There are four per pipeline, and they can all be competing for priority in a given cycle.

It can be seen that there may be as many as 28 valid requests in the SC competing for priority for one pipeline in a given cycle—six CP fetches, six CP stores, four I/O adapter requests, four remote SC requests, four LFAR requests, and four LSAR requests. There may be as many as 50 valid requests overall (the six fetch requests may be to either pipe). Requests of the same type compete with each other for priority first, in the "pre-priority" stations. One request of a given type, for example, one CP fetch request, is chosen by the pre-priority logic and sent to the overall priority arbitration logic, where it competes for priority with other types of requests. The pre-priority stations employ standard priority algorithms such as round-robin or pseudo-LRU (the request which completed an operation most recently has the lowest priority). Different pre-priority stations use different algorithms, to optimize performance for the specific request type being processed.

The overall priority arbitration logic uses a ranked priority order scheme, that is, each category of request has a fixed priority relative to other request types. The priority order is assigned in terms of relative frequency of operations. This is done to prevent less-frequent operations from being locked out by more-frequent operations. Requests from the remote SC, the least frequent operations, have highest priority. Next in priority are requests from LFAR and LSAR, followed by I/O adapter requests, CP fetches, and CP stores, which have the lowest priority because they are the most frequent operations.

The overall priority arbitration logic selects up to two requests, one per pipeline, per cycle. Once a request is selected, its associated address and control information are gated into one of two internal processing pipelines within the SC, and it begins to execute. As mentioned previously, a request will usually complete its processing during a single pipeline pass. If a request's execution is interrupted for some reason, it must go through pre-priority and overall priority arbitration again for each additional pipeline pass.

As a request executes, it will utilize resources within the SC, such as the cache interleaves, or the hardware facilities (LFAR's) used to fetch data from main store to the SC. Those resources will be unavailable for the use of other requesters for one or more cycles. Since some checking for resource availability is done during pre-priority arbitration, and some is done during operation execution, this may prevent other requesters from getting priority or from completing their processing.

Deadlocks can occur among SC requestors in two ways: 1) higher-priority requesters may use up priority grant cycles, preventing lower-priority requesters from receiving a grant, and 2) a sequence of requests may busy resources in the SC in such a way that other operations are unable to request priority, or are unable to complete their execution even if they have gotten priority. Case (2) can result in the expected case of higher-priority requests blocking lower-priority ones, or the less-expected case of requests of equal priority (for example, CP fetches) locking each other out, or even the case of lower-priority requests locking out higher-priority ones. An example of case (1) which has been observed is that of I/O requests occurring in a large burst, and as a result locking out CP fetches.

In extreme cases, a lockout situation can result in a severe recovery action and possibly a system outage. Experience has shown that regardless of how much care is taken to create a design which has no potential for deadlocks, specific sequences of requests can occur which cause one or more requesters to be locked out.

A prior art approach to detecting and preventing deadlocks between requests is described in U.S. Pat. No. 5,016,167 (issued to Nguyen et al. on May 14, 1991). Their method of detecting deadlocks is to have each CP requestor count the number of times its request is rejected due to unavailability of resources (main memory interleaves). If a requester exceeds a certain number of rejects, it generates an "inhibit" signal, which is used to block other CP requests from getting priority.

In our invention, the deadlock detection is located in the storage controller, a centralized piece of logic. This allows the detection of potential deadlock situations among all types of requestors. It will resolve lockout scenarios among requestors of the same relative priority or those of different priorities. Additionally, the blocking of other requestors is done within the SC, at the request register level. This avoids the complexity and delay involved in retrying an operation from a requester external to the SC. A key difference is that our invention will detect a potential lockout of a requestor which hasn't been granted priority and hasn't made a pipeline pass, since it is based on the amount of time the request has been valid in the SC without completing, rather than on the number of times the request has started to execute.

In our invention, the blocking of a requestor is conditional based on whether that requestor has already started to execute. If so, it will not be affected by the deadlock detection logic. This avoids the possibility of blocking an operation which may have to complete before the locked-out operation can complete.

Our invention also makes use of an internal pulse, which has been designed to occur at the correct interval to resolve potential deadlocks before a storage controller hang is detected, instead of a counter. The pulse is received by specialized logic stations, which allow programmability for the interval used to detect deadlocks, and provide the ability to disable the deadlock resolution function for specific categories of requests.

SUMMARY OF THE INVENTION

Our invention provides a centralized deadlock resolution system to handling deadlocks among requestors in a multiprocessor system.

The invention achieves this using a centralized hardware mechanism within the storage controller (SC). Potential lockouts are resolved among different types of requests, with different assigned priority levels, competing for resources within the SC. These potential hang scenarios are resolved long before an actual hang is detected by the storage controller and before recovery is invoked.

These improvements are accomplished by providing a means for monitoring the valid bits of the request registers within the SC. The valid bits for these registers are set when the request is received by the SC, and reset when execution of the request is complete. Also provided is a pulse, which will be referred to as the "internal hang detect pulse", which becomes active for one cycle at a fixed time interval. That time interval is a subset of the time interval for the pulse which is used to detect a hang within the storage controller, referred to as the "global hang pulse".

The logic which monitors the request register valid bits also monitors the internal hang detect pulse. If a request register is valid continuously throughout an interval where two internal hang detect pulses occur, an "internal hang detect" latch is set, indicating that there is a potential deadlock condition. As a result, an internal hang detect output signal is set.

Also provided is a means for the control logic for each request type to monitor the internal hang detect output signal, and to take appropriate action when the signal is active. This action consists of deciding whether each specific request has already been granted priority and made a pipeline pass at least once. If so, the internal hang detect output signal is ignored for that request. If not, the processing of the request is interrupted and it is held in an inactive state. Eventually, all requests in progress will complete, and all new requests will be in a held state. This allows the request which detected the internal hang to complete and to reset its valid bit, which will reset the internal hang detect latch and the internal hang detect output signal. Once the internal hang detect output signal is reset, all valid requests are released and are eligible to compete for priority.

Internal hang detect latches may be set independently for multiple requests. In this case, the internal hang detect output signal sent to the control logic stations remains active for as long as any internal hang detect latch is set. Multiple requests setting internal hang detect latches won't interfere with each other. Once all requests in progress have completed, and new requests are in a held state, all of the requests which have detected an internal hang will complete. The internal hang detect output signal will be reset, and all valid requests will be released from the held state and will compete for priority.

The internal hang detect output signal is only kept active for one interval between internal hang detect pulses. The signal changes state whenever an internal hang detect pulse is received. For example, if it is on, and an internal hang detect pulse is received, it is turned off. If any requests set internal hang detect latches, or have internal hang detect latches which remain on, the internal hang detect output signal will become active again after the next internal hang detect pulse. This is done to handle unforeseen problems with the use of the internal hang detect mechanism, such as cases where it has the effect of creating a deadlock. The internal hang detect hardware is unaffected by this. Request register valid bits are still monitored, and additional internal hang detect latches may be set. Only the internal hang detect output signal broadcast to the control logic is blocked.

Disable latches are provided to allow the internal hang detect pulse to be ignored for a specific category of requests (for example, all CP fetch requests). If the disable latch is set, the internal hang detect latches will never be set for the associated group of requests.

A large degree of flexibility and programmability is provided for the interval of the internal hang detect pulse. The global hang pulse, from which the internal hang detect pulse is derived, can be varied in length, e.g. from every 16 thousand cycles to every 512 thousand cycles. A "short hang detect pulse" is generated based on the global hang pulse. Depending on the setting, 8, 16, 32, 64, or 128 short hang detect pulses may occur within one global hang pulse interval. To provide further flexibility, the logic which receives the short hang detect pulse counts the pulses until the count matches a fixed value register. At that time, the internal hang detect pulse is generated. This allows the internal hang detect pulse to be generated after a count of from one to seven short hang detect pulses. Setting the fixed value register to all 0's disables the generation of the internal hang detect pulse, and therefore disables the deadlock resolution logic. These and other improvements are set forth in the following detailed description. For a better understanding of the invention with advantages and features, refer to the description and to the drawings.

DETAILED DESCRIPTION OF THE INVENTION

Overall system structure

Figure 1:
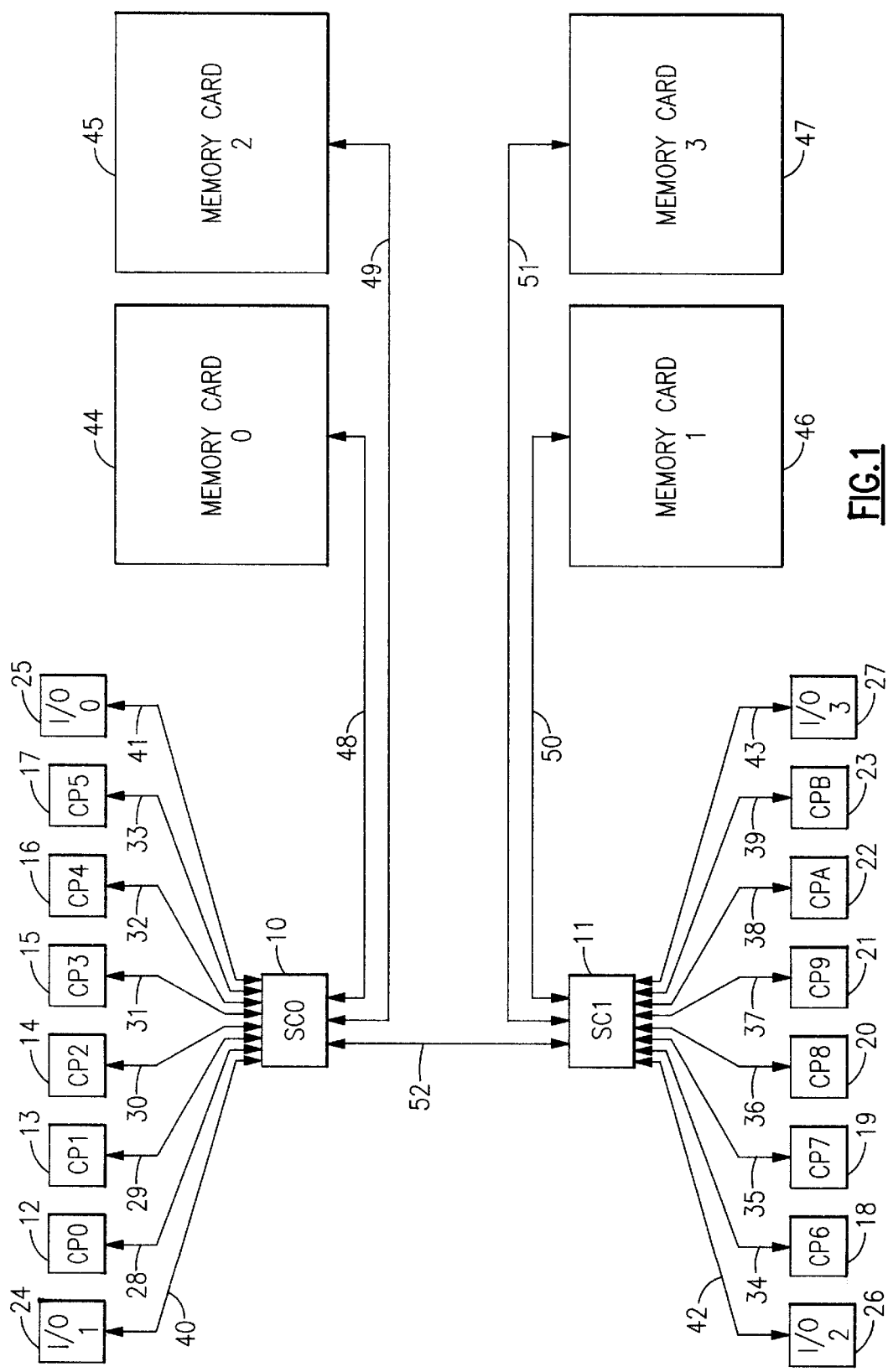
FIG. 1 is a system overview of the multiprocessor system of the preferred embodiment.

FIG. 1 shows an overview of the multiprocessor system which is the preferred embodiment of the present invention. In a fully configured system, a maximum of twelve CP's (12, 13, 14, 15, 16, 17, 18, 19, 20, 21, 22, 23), four I/O adapters (24, 25, 26, 27), and four memory cards (44, 45, 46, 47) may be connected to two storage controllers (10,11). It is possible to have a one-node system containing only one SC. Such a system supports a maximum of six CP's, two I/O adapters, and two memory cards. Each CP contains a store-through level 1 (L1) cache, while each SC contains a store-in level 2 (L2) cache.

A CP or I/O adapter connects directly to only one SC. A given SC has direct access to two of the memory cards, SC0 (10) to memory card 0 (44) via one bus (48), and to memory card 2 (45) via a separate bus (49). Similarly, SC1 (11) has access to memory card 1 (46) by means of one bus (50), and to memory card 3 (47) using a separate bus (51). However, all CP's and I/O adapters have access to any portion of the main memory. Storage access to the other two memory cards is handled by an SC-to-SC operation (52), which is transparent to the CP or I/O adapter. Each CP or I/O adapter has two data buses to the attached SC, referred to as data bus A and data bus B. Storage data from memory cards 0 and 1 (44, 46) is returned on bus A, while data from memory cards 2 and 3 (45, 47) is returned on bus B.

All requests to the SC are initiated by sending an address and command to the SC from a CP, I/O adapter, or other (remote) SC. When the SC has completed the request, a response, and possibly data, are sent back to the originator of the request.

Fetch and store requests from a CP to its attached SC utilize a group of unidirectional and bidirectional buses (28, 29, 30, 31, 32, 33, 34, 35, 36, 37, 38, 39) to transmit commands, addresses, data, and responses. CP fetch and store requests are sent via a unidirectional bus for the address and command portions of the request, and two bidirectional buses for sending the data portion. The data portion of the request may be store data sent from the CP to the SC, or fetch data sent from the SC to the CP. These bidirectional buses are the data bus A and data bus B referred to previously. They are each one quadword wide. There is also a unidirectional bus from the SC to each CP used to send responses, indicating when a fetch or store request has completed and what the status of the request was, for example, normal completion, or invalid address.

The I/O adapter interface is also made up of bidirectional and unidirectional buses (40, 41, 42, 43). In this case, commands, addresses, and responses are sent between the SC and the I/O adapters via a bidirectional bus. Fetch and store data is sent on two bidirectional buses, data bus A and data bus B, each a doubleword wide. Unidirectional buses are used for other control signals.

The remote SC interface uses unidirectional buses for commands, addresses, responses, and data (52). Thus, there are two sets of these buses in a fully configured system, one from SC0 to SC1, and one from SC1 to SC0. Data is transmitted on four quadword-wide unidirectional buses: bus A and bus B from SC0 to SC1, and bus A and bus B from SC1 to SC0. In the case of the one-node system described above, there is no remote SC, and therefore there are no requests originating from the remote SC.

High-level address flow

Figure 2:
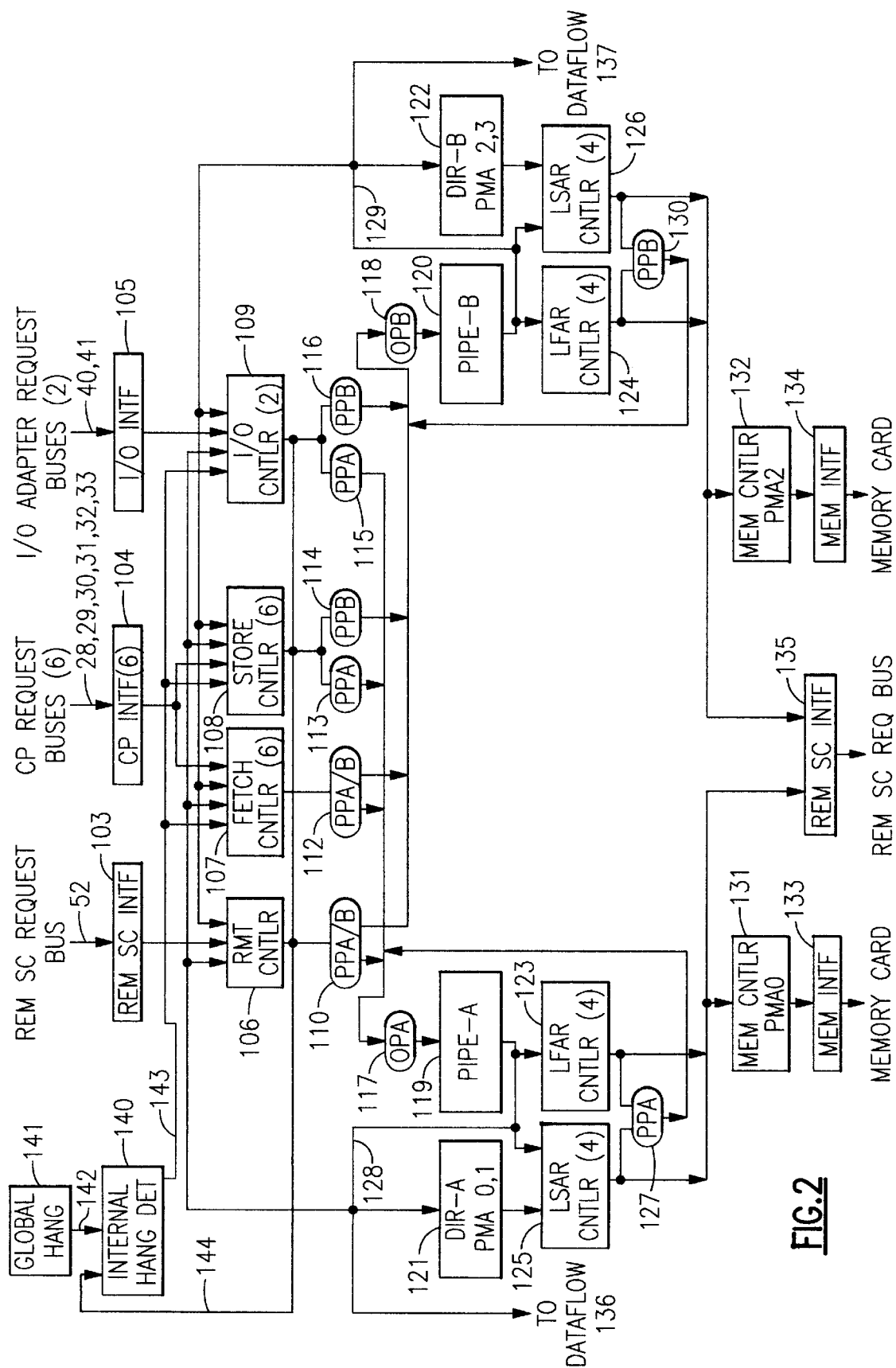
FIG. 2 is a diagram of the address flow for a single storage controller in the multiprocessor system of FIG. 1.

FIG. 2 shows the high-level address flow for one of the storage controllers (SC0) shown in FIG. 1. There are two separate pipelines, referred to as pipeline A (119) and pipeline B (120), each with its own directory (121, 122), and each with an interface to one memory card (133, 134) via the memory controller logic (131, 132). The two processing pipelines in the SC correspond to the two data buses mentioned previously. Pipeline A handles requests for storage on bus A (memory card 0) while pipeline B handles requests for storage on bus B (memory card 2). The pipeline information is forwarded to the dataflow logic (136, 137), where it is used to access the L2 cache. It is possible to have a system with only one pipeline per SC. In this case, the SC has access to only one memory card.

The directory associated with a given pipeline is accessed on the first cycle of an operation's pipeline pass. If there is a directory hit, data is returned from the L2 cache. If there is a directory miss, further processing of the request is handled by the line fetch address register (LFAR) logic (123, 124). The address and control information for the request will be gated into one of four LFAR registers available for each pipeline. A request is sent to the remote SC via the remote SC interface register (135). The cache in the remote SC is interrogated, and the data will be sent from the remote SC to the attached (local) SC, and from there to the requesting CP or I/O adapter. If there is a miss in the remote SC cache, the request will be sent to one of the memory cards attached to the local SC, or to one of the memory cards attached to the remote SC, depending on the target address.

If a cache entry must be castout to make room for a new entry the L2 cache, it is handled by the line store address register (LSAR) logic (125, 126). The address targeted for replacement using an LRU algorithm is gated into one of the four LSAR registers available for each pipeline. The LSAR logic controls storing the data to main memory and invalidating the entry in the cache.

Requests originating external to the SC, which may be either fetches or stores, are received via the remote SC interface (52), the six CP interfaces (28, 29, 30, 31, 32, 33), and the two I/O adapter interfaces (40, 41). In each case, an interface register (103, 104, 105) is used to latch the information for a request for one cycle. After that, it is sent to the associated controller.

Each functional area within the SC has a separate controller, which handles input from the interface, priority requests, and control of the request as it passes through the pipeline. There are two I/O adapter controllers (109), six CP fetch controllers (107), six CP store controllers (108), and one remote SC controller (106). Within each controller, there are holding registers to keep track of the information associated with a given request. These registers will remain valid until the request is completed by the SC. In most cases, some decoding of the request must be done to direct it to the correct holding register.

Within the remote SC controller (106), separate registers are used for fetch and store requests from the remote SC, with two registers per pipeline dedicated to holding fetches and two dedicated to holding stores. The interface information includes a pipeline select, which chooses one group of four registers, and the command is decoded to determine whether it is a fetch or store, to select the pair of fetch or store registers.

A single interface register is used for CP fetch and store requests for each CP (104). The incoming command must be decoded to determine whether it is a fetch or store. Requests are staged from the interface register to the associated CP fetch controller (107), which contains one fetch request register, or CP store controller (108), which contains two eight-entry stacks, one for each pipeline, containing addresses and control bits for store requests.

Commands sent from the I/O adapters may also be fetches or stores. The I/O controller (109) has two request registers per I/O processor per pipeline, for a total of four registers per pipeline, each of which may hold a fetch or a store. The I/O adapter keeps track of which registers are available within the I/O controller, and it indicates the destination register when the command is sent.

Within each controller, the signals indicating a valid request, in addition to other control information, are used to determine whether the request is eligible for priority in a given cycle. All eligible requests in a given category are sent to the associated pre-priority logic station. For remote SC requests, there is a single pre-priority station (110) for both pipelines. A single request is chosen for pre-priority for either pipeline A or pipeline B. A request in the interface register is able to get immediate priority, and has the highest priority. If there is no request in the interface register, the pre-priority logic arbitrates among the four registers for each pipeline using a pseudo-LRU algorithm (request which completed most recently has lowest priority). Priority is alternated between the two pipelines.

There is a single pre-priority station for CP fetches (112) for both pipelines also. A pseudo-LRU algorithm is used to choose one out of as many as six eligible requests. This arbitration is done without regard to the destination pipeline of the CP fetch request. CP stores must be processed in the order they are received. The stacks which are used to buffer store requests are managed in FIFO order. Only the oldest store for each pipeline from a given CP is eligible for priority. There are two separate pre-priority stations for CP stores, one per pipeline (113, 114), therefore is is possible for two different stores to be granted pre-priority in one cycle. The pre-priority stations for CP stores employ a modified round-robin algorithm for each pipeline to choose one store out of as many as six eligible requests.

The I/O controller also has separate pre-priority stations for pipelines A and B (115,116). A pseudo-LRU algorithm is used to determine pre-priority among the four possible requests for each pipeline, without regard to whether they are fetch or store operations.

There is a shared pre-priority mechanism for LFAR's and LSAR's (127, 130). If there are multiple LFAR requests, they are chosen in order LFAR 0 first, then LFAR 1, 2, and 3. Similarly, if there are multiple LSAR requests, they are chosen in order starting with LSAR 0, then LSAR 1, 2, and 3. A toggle latch alternates priority between LFAR and LSAR.

The overall priority arbitration logic for a pipeline (117, 118) selects one request, using a ranked priority order. The order has been determined based on frequency of requests, with the least-frequent requests having highest priority, and the most-frequent requests having lowest priority. The priority order, from highest to lowest, is: remote SC requests, LFAR/LSAR requests, I/O adapter requests, CP fetch requests, and CP store requests. Address and control information for the selected request is sent to the first stage of the pipeline.

Each controller receives inputs from both pipelines (128, 129), and tracks the progress of its requests through the pipeline, monitoring input signals which are valid in specific pipeline cycles. Some of these signals are used to determine whether the request is currently in a certain stage of the pipeline. Examples of other pipeline inputs are directory hit results and compares against other address registers. These inputs are used to decide whether all the resources needed for the request are available, or if its processing must be interrupted to wait for some condition to be satisfied. When the processing of a request is interrupted, signals are sent to the pipeline logic. Controls are reset so that this request no longer appears as a valid entry in later stages of the pipeline. Signals are also sent to various logic stations within the controller. Actions taken within the controller include resetting control bits which indicate that the request is currently executing.

The subject of this invention, the internal hang detect logic (140), receives valid request indicators from the control logic for the remote SC, CP fetches, CP stores, and I/O adapters (144). It also receives a subset of the global hang detect pulse (142) from the global hang pulse logic (141). These are monitored to detect internal hang conditions, as described below. When an internal hang is detected, a signal is broadcast from the internal hang detect logic to the CP fetch, CP store, and I/O controllers (143).

Generation of internal hang detect pulse

Figure 3:
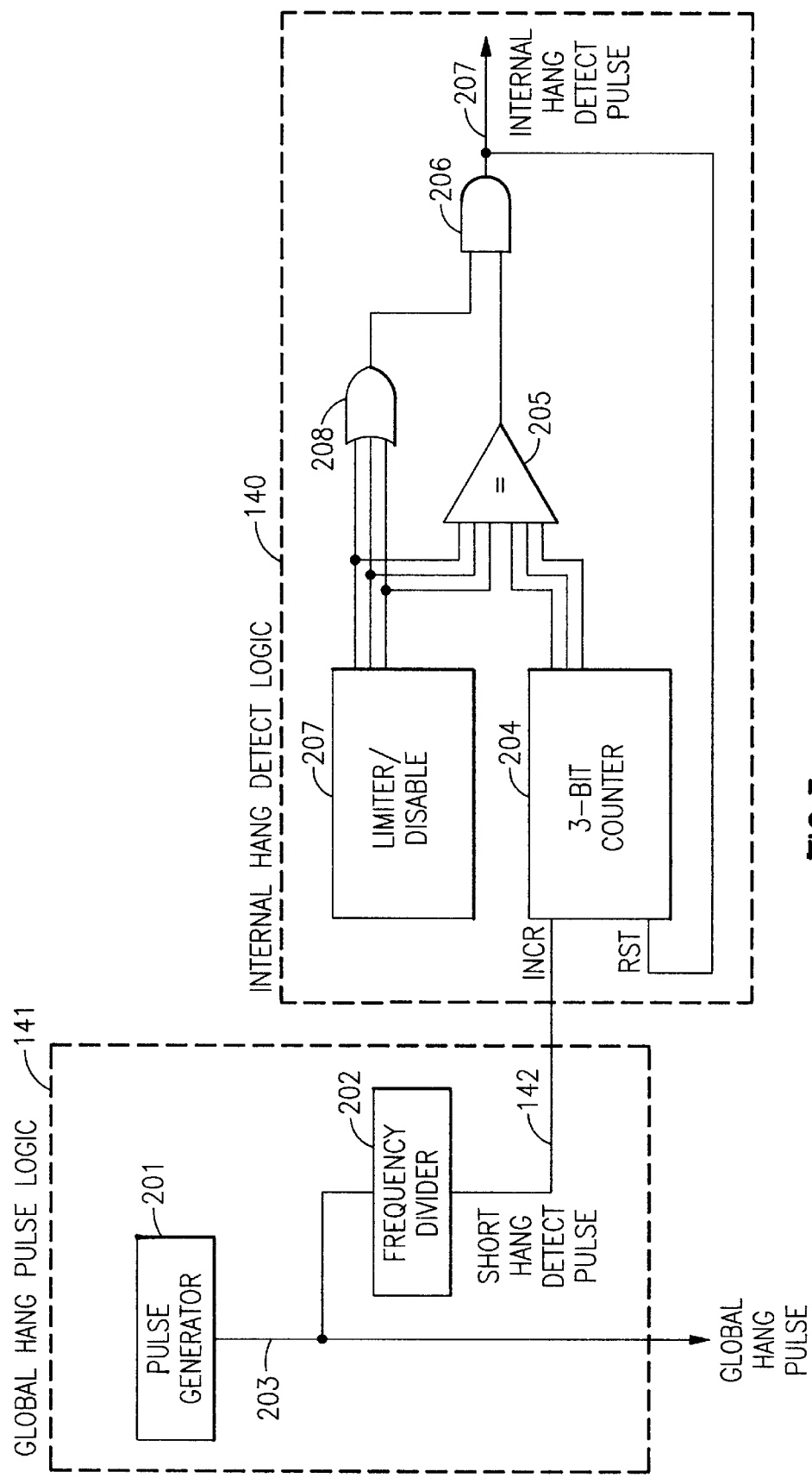
FIG. 3 shows the generation of the internal hang detect pulse.

FIG. 3 shows the method for generating the internal hang detect pulse. The global hang pulse logic (141) contains a pulse generator (201), which produces the global hang pulses (203) used to detect hangs within the SC. The time between consecutive pulses is programmable, and can be set between 16 thousand cycles and 512 thousand cycles. A short hang detect pulse (142) is generated from the global hang pulse by means of a frequency divider (202). Several of these short hang detect pulses will occur in the period between two global hang pulses. The number can be set to 8, 16, 32, 64, or 128, resulting in between 8 and 128 short hang detect pulses occurring in the period between two global hang pulses.

The short hang detect pulse (142) is sent to the internal hang detect logic (140). There, it feeds a three-bit counter (204), which is incremented by one each time a short hang detect pulse is received. This logic also contains a three-bit limiter/disable register (207), whose value is compared against the output of the counter every cycle by means of a comparator (205). The three bits of the limiter/disable register are OR'ed together (208), and the result is AND'ed (206) with the output of the comparator. This allows the generation of the internal hang detect pulse (207) to be disabled by setting the limiter/disable register to a value of '000'B. When the counter value matches the value in the limiter/disable register, and the limiter/disable register has a non-zero value, an internal hang detect pulse is generated, and the counter is reset.

Individual request hang detect

The internal hang detect pulse (207) is sent to several logic stations within the internal hang detect logic (140). Each station checks for an internal hang detect for a specific request, by monitoring the internal hang detect output signal and the valid bit, or its equivalent, for that request. (It should be noted that requests from the remote SC can set internal hang detect latches, but this logic does not check the internal hang detect output signal. Thus, a request from the remote SC will hold up other requests if it triggers the internal hang detect, but it will not be held up by internal hangs detected among other request types, or among other remote SC requests. Holding up remote SC requests would be likely to cause more deadlocks than it would resolve.)

Figure 4:
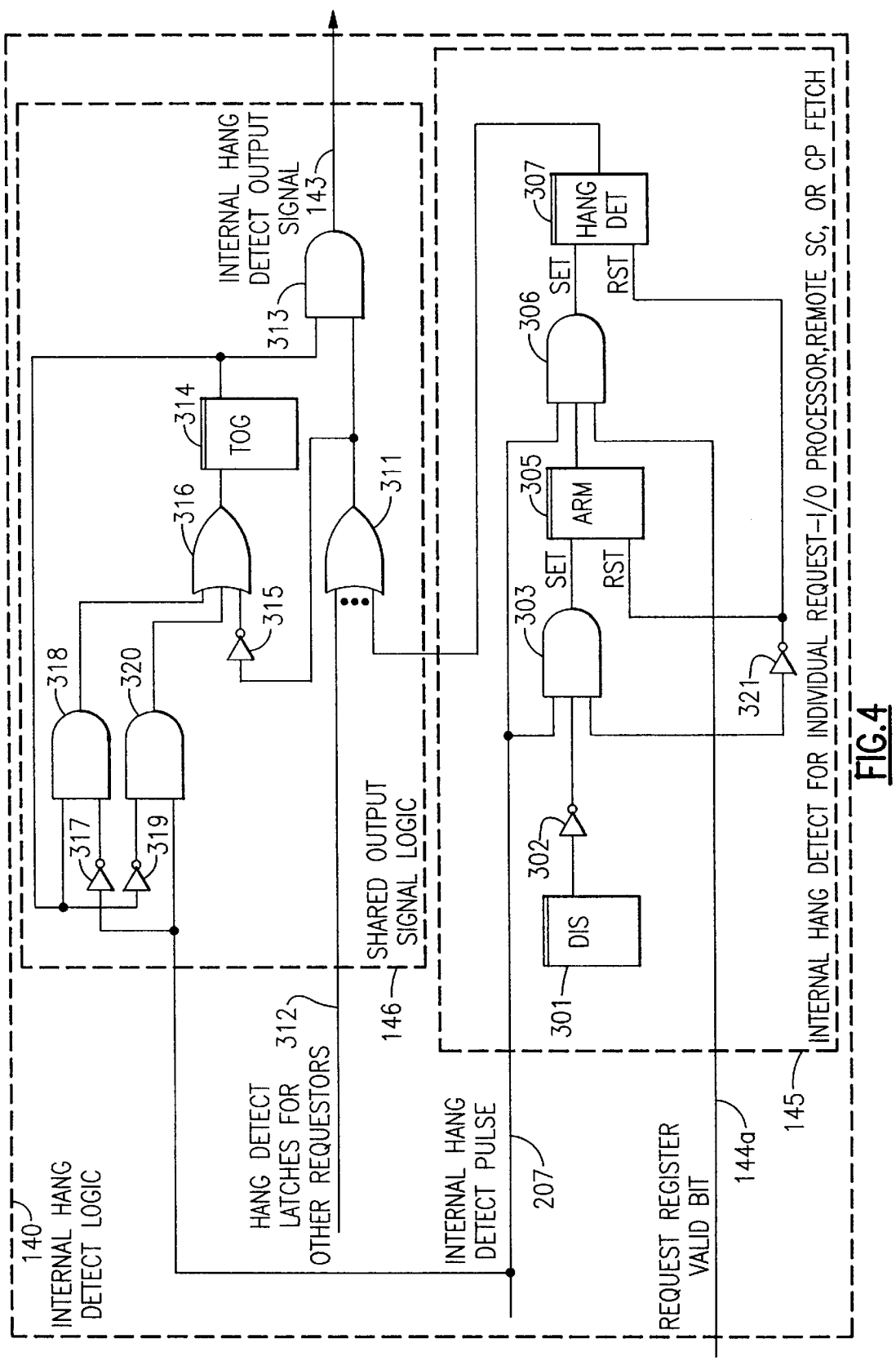
FIG. 4 shows the internal hang detect logic for one particular request, either a CP fetch, I/O adapter fetch or store, or a remote SC fetch or store, and the logic which generates the internal hang detect output signal.

FIG. 4 shows the internal hang detect logic for one particular request, either a CP fetch, I/O adapter fetch or store, or a remote SC fetch or store (145), and the shared output signal logic (146), which generates the internal hang detect output signal (143). The internal hang detect logic for each request contains an arm latch (305) and an internal hang detect latch (307). There is also a disable latch (301) for each request type, which is set to '1'B to disable any internal hang detect checking for that particular category of request. For example, internal hang detect checking can be disabled for all requests from the remote SC. This disable latch is set via the hardware initialization data.

The internal hang detect pulse (207), the request register valid bit (144a), and the inverse of the disable latch (302) are AND'ed (303) to set the arm latch (305). The internal hang detect pulse (207), the request register valid bit (144a), and the output of the arm latch (305) are in turn AND'ed (306) to set the internal hang detect latch (307) for the request. The first internal hang detect pulse which occurs while the request is valid will set the arm latch. If a second internal hang detect pulse occurs while the arm latch is set, the internal hang detect latch is set. The arm and internal hang detect latches are reset with the inverse of the request register valid bit (321). If the request completes at any time, the request register valid is reset, causing the arm and internal hang detect latches to be reset. It can be seen that a request register must remain valid for at least the period of time between two consecutive internal hang detect pulses for the internal hang detect latch to be set. If the valid is set immediately after the occurrence of an internal hang detect pulse, the request register may be valid for almost three internal hang detect pulses before the internal hang detect latch is set.

The internal hang detect latch for this request (307) is OR'ed (311) with the internal hang detect latches for all other requests (312). The result of this OR (311) is AND'ed (313) with the toggle latch (314) to create the internal hang detect output signal (143). The toggle latch is used to change the state of the internal hang detect output signal whenever another internal hang detect pulse is received. The toggle latch is initially forced to '1'B if no internal hang has been detected. This is done by inverting the OR of the internal hang detect latches (315) and feeding it into an OR gate (316) at the input of the toggle latch. Once any hang has been detected, the value of the toggle latch will be inverted every time an internal hang detect pulse is received. This is done by AND'ing (320) the internal hang detect pulse (207) with the inverted output of the toggle latch (319), and feeding that into the input OR gate (316). The output of the toggle latch is also AND'ed (318) with an inverted copy of the internal hang detect pulse (317), and the result is fed into the input OR gate (316). This results in the toggle latch holding its value when there is no internal hang detect pulse.

As a result of using the toggle latch, the internal hang detect output signal will go active when a request sets the internal hang detect latch, but if the internal hang detect latch is still on when the next internal hang detect pulse is sent, the internal hang detect output signal is turned off. This is done to avoid any unforeseen deadlocks caused by the use of the internal hang detect. It can be seen that the toggle latch only gates the output signal, and has no effect on the arm latches and internal hang detect latches for individual requests.

The setting of the arm and internal hang detect latches for each request register are independent of each other, thus, internal hang detect latches may be set for multiple requests. Since all internal hang detects are OR'ed (311), the internal hang detect output signal will stay active as long as any one of the internal hang detect latches is on and the toggle latch (314) is on. Once all requests which have detected internal hangs have completed and reset their valid bits, all of the internal hang detect latches will be reset and the internal hang detect output signal will be reset.

Figure 5:
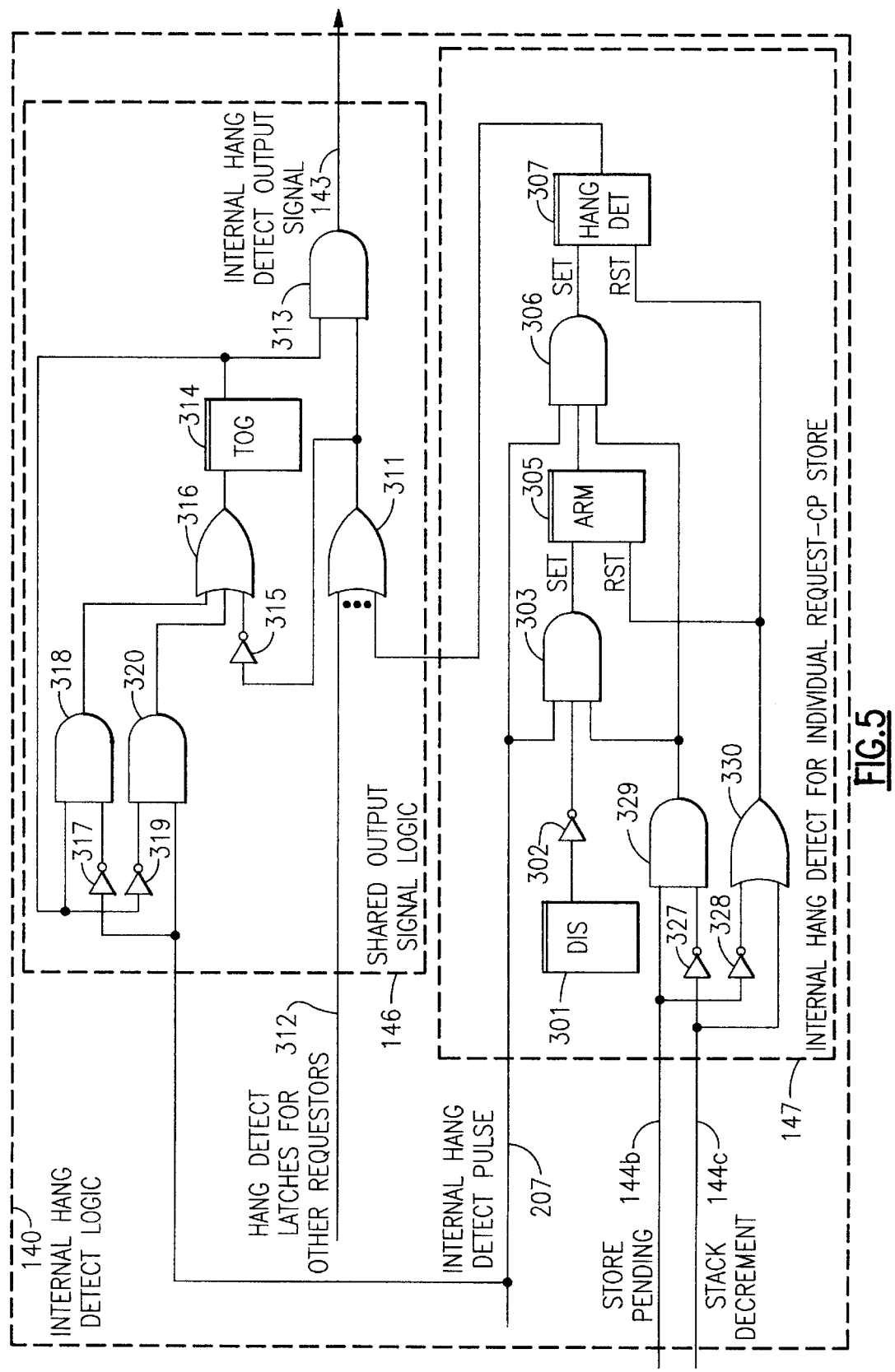
FIG. 5 shows the internal hang detect logic for a CP store, and the logic which generates the internal hang detect output signal.

FIG. 5 is identical to FIG. 4, with the exception that FIG. 5 shows the internal hang detect logic for a CP store. For a CP store, there is no individual valid bit for the request. The facilities which are used to set and reset the arm (305) and internal hang detect latches (307) are the store pending signal (144b), which indicates that there is at least one store in the store stack, and the stack decrement signal (144c), which indicates that the SC has completed a store request. When store pending drops, it indicates that the store stack is empty (i.e., all stores have completed). In some cases, such as certain recovery scenarios, the store stack is reset without completing the stores, making it necessary to check store pending in addition to stack decrement.

The arm latch (305) is set by AND'ing (303) the internal hang detect pulse (207), the inverse of the disable latch (302), and the store pending signal (144b) AND'ed (329) with the inverse of stack decrement (327). The internal hang detect latch (307) is set by AND'ing (306) the internal hang detect pulse (207), the output of the arm latch (305), and the store pending signal (144b) AND'ed with the inverse of stack decrement (327). Thus, if store pending is on for a particular CP and one internal hang detect pulse is received, the arm latch will be set. If store pending remains on, the arm latch remains on, and a second internal hang detect pulse is received, the internal hang detect latch will be set. The arm and internal hang detect latches are reset using the OR (330) of the stack decrement signal (144c) with the inverse of store pending (328). If stack decrement is set or store pending is reset, the arm and internal hang detect latches are reset. The internal hang detect latches for CP stores are OR'ed (311) with those for other requests, and the output is AND'ed (313) with the toggle latch (314) to create the internal hang detect output signal, as described for FIG. 4.

Individual controller

Figure 6:
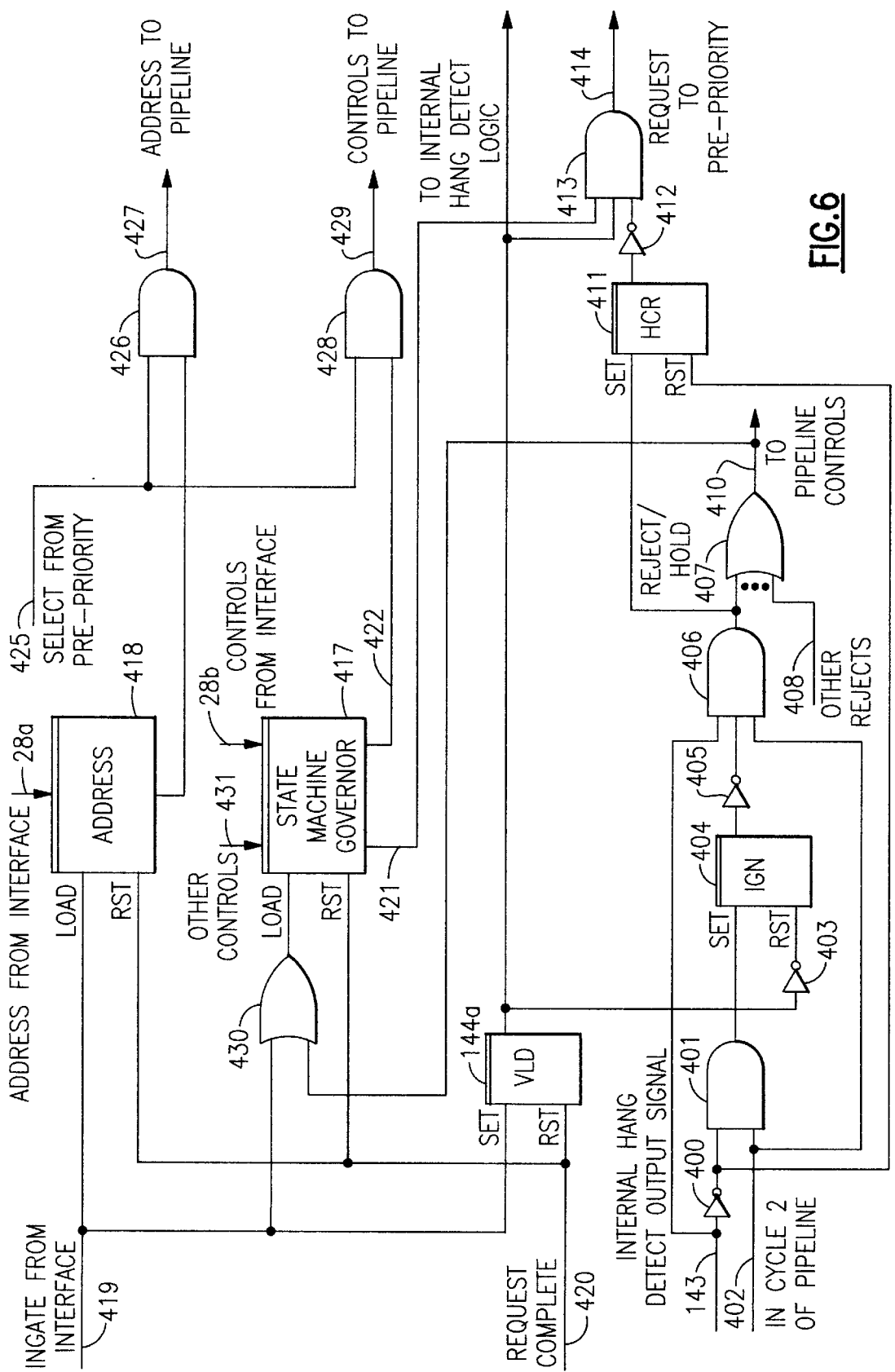
FIG. 6 shows an example of one of the individual functional controllers for a request, and how it responds to the internal hang detect output signal.

FIG. 6 shows the logic for an individual controller. For purposes of example, the controller for a fetch from CP0 is shown. A controller includes registers to hold the information for one specific request until the SC has completed its processing. One register holds the address (418) received over the inter-face (28a). Another register is the state machine governor (417), which holds control information sent over the interface (28b), such as the command, as well as additional control information which is generated as the request executes (431). There is also a valid bit register (144a), whose output is used within the controller and is also sent to the internal hang detect logic. The valid bit is set, and the address register and state machine governor are loaded, when a fetch command from CP0 is detected in the interface register, resulting in an ingate signal (419). All of these registers are reset when the request completes (420).

Each controller also contains logic to handle:
determining if a request is eligible for priority
sending the request to the pre-priority logic
sending the information for the request to the pipeline controls if it is granted pre-priority
monitoring the request as it goes through the execution pipelines
interrupting the execution of the request, if necessary
saving information about the current pipeline pass if execution is interrupted
holding the request in an inactive state, if necessary
resuming execution of the request after it has been interrupted The controller uses the valid bit (144a), AND'ed (413) with a signal from the state machine governor (421), to determine whether the request is eligible to compete for priority. Also included in this calculation is the hold condition register (411), which is inverted (412) before being AND'ed. This prevents the request from being eligible for priority if the hold condition register is non-zero. The hold condition register will be discussed in more detail in the following sections.

If the request is eligible for priority, the controller sends a priority request signal (414) to the pre-priority logic for its particular request category, in this example, to the CP fetch pre-priority logic. If the request is granted pre-priority, a select signal (425) from the pre-priority logic is sent to the controller. The address for the request (418), and certain control information from the state machine governor (422), are gated with the select (426, 428) and sent to the pipeline logic (427, 429). If the request is granted priority by the overall priority logic, these fields will be gated into one of the two execution pipelines.

Each controller also contains logic to monitor the progress of the request through the execution pipelines. Control signals are received from each stage of both pipelines. These signals are used to determine if the request is in a specific stage of one of the pipelines. Other types of pipeline control information are received as well, for example, directory hit signals and signals indicating address compares against other request registers.

A given request may have to make more than one pass through the pipeline before it completes. The controller provides mechanisms for interrupting the processing of a request as it passes through the pipeline, and later resuming processing. This interruption is known as rejecting the request. When the request is rejected for some reason, control signals are sent to the pipeline to indicate that the request is no longer active. Control signals are also sent to the state machine governor, which will be updated to indicate that the request is no longer active, and to save information about the results of the current pipeline pass. This information will be used to determine the actions taken in future pipeline passes.

Once a request has been rejected, it may need to be held in an inactive state until a specific condition is satisfied. The hold condition register (411) is used for this purpose. It is set when the request must wait for a particular event, and then is reset when that event occurs. When the hold condition register is non-zero, it blocks the request from being eligible for priority, therefore preventing the request from making pipeline passes. Multiple hold condition registers may be used to allow the request to wait for several different conditions.

To resume the execution of a request after it has been rejected, the controller must resend the request to the pre-priority logic. This will either happen immediately, if there is no need to hold up the request, or after the hold condition register has been reset.

Examples of several of these mechanisms are shown in FIG. 6 for the case of internal hang detects. The specific pipeline information which is checked for the case of the internal hang detect is that which indicates that the request is in the second cycle of one of the pipelines (402). If it is the second pipeline cycle, two actions are taken.

First, the signal indicating that it is the second pipeline cycle (402) is AND'ed (401) with the inverse (400) of the internal hang detect output signal (143). The result is used to set the ignore internal hang latch (404). Thus, the ignore internal hang latch is used to remember that this request has made a pipeline pass when the internal hang detect output signal is off. This information will be used for any future pipeline passes. When the ignore internal hang latch is set, it will block the request from checking the state of the internal hang detect output signal. The inverse of the request valid (403) is used to reset the ignore internal hang latch (404), causing it to be reset when the request completes.

Second, checks are done for reject conditions for the request in the second cycle of the pipeline. The check shown in FIG. 6 is the check for the internal hang detect output signal (143) on. The internal hang detect output signal (143) is AND'ed (406) with the inverse of the ignore internal hang latch (405), and with the signal indicating that this is the second stage of the pipeline (402). The result is a reject for the request, which is used to set the hold condition register (411). Thus, the request is only rejected due to internal hang detect if it has not made a previous pipeline pass when the internal hang detect output signal was off. This is done so that any requests which have already started to execute before the internal hang detect output signal comes on will be able to complete. Otherwise, requests in progress may have set up controls (for example, bits indicating that they are valid for compares) which would block the execution of the request which has detected the internal hang.

Other possible reject conditions are checked in various pipeline cycles, for example, address compares against other request registers are checked in the first pipeline cycle. The internal hang reject information is OR'ed (407) with all other possible rejects for the request (408). If any reject occurs, a signal (410) is sent to the pipeline controls and to the state machine governor. This signal is OR'ed (430) with the ingate from the interface, and causes the state machine governor register to be loaded from the signals generated within the controller (431).

The hold condition register (411) blocks the pre-priority request, since its inverse (412) is AND'ed (413) with the other signals used to generate the pre-priority signals (414). It is reset with the inverse (400) of the internal hang detect output signal (143), and therefore is reset when the internal hang detect output signal is reset. At that point, the request will be sent to the pre-priority logic again and can make further pipeline passes.

The controllers which participate in the internal hang detect function are those for CP fetches, CP stores, and I/O adapter requests. The reject checking described above is done by all of these controllers. When the internal hang detect output signal goes active, eventually all requests with the ignore internal hang latch set will complete, and all those without the latch set will be in a held state, waiting for the internal hang detect output signal to be reset. This will leave requests which have set their internal hang detect latches as the only operations competing for priority, so they will eventually complete. When all of the requests which have set their internal hang detect latches have completed, the internal hang detect output signal will be reset. At that point, the hold condition registers for all requests will be reset, and all valid requests will be eligible for priority.

The controller for requests from the remote SC doesn't receive the internal hang detect output signal, although the valid bits for remote SC request registers are used to set internal hang detect latches and the resulting internal hang detect output signal. Thus, CP and I/O adapter requests will be held up if a hang is detected by a remote request, but the remote requests won't be held up by hangs detected by any other element.

We have described the preferred embodiment of the present invention for purposes of illustration arid description. It will be understood that those skilled in the art, both now and in the future, may make various improvements and enhancements which fall within the scope of the claims which follow. These claims should be construed to maintain the proper protection for the invention first disclosed.

What is claimed is:

1. A computer system having a storage controller, comprising,
   a plurality of requesters including processing elements processing with pipeline passes, and making requests for fetches and stores, and other requesters for memory attached via a bus and other requestors
   a storage controller mechanism (SC),
   a deadlock resolution logic used for detecting potential deadlock situations among competing requesters including request logic for processing requests for processor fetches and stores and other requests, and having a mechanism to interrupt request processing and to keep a request in a held state until a specific condition has been satisfied, and then for allowing the request to resume, and including global hang pulse logic for detecting hangs in the storage controller mechanism and for generating short hang pulses, and internal hang detection logic for generating an internal hang detect pulse when a number of short hang pulses are detected there is an indication that there is a potential deadlock condition, and as a result, an internal hang detect output signal is set, and having control logic for use in ignoring detected hangs in pipeline passes.

2. A symmetric multiprocessor system according to claim 1, wherein said deadlock resolution logic resolves potential deadlocks among requesters said multiprocessor system within the storage controller mechanism, and potential lockouts are resolved among different types of requests, with different assigned priority levels, competing for resources within the storage controller mechanism by resolving potential hang scenarios long before an actual hang is detected by the storage controller mechanism before recovery is invoked.

3. A symmetric multiprocessor system according to claim 2, wherein said storage controller mechanism uses registers to hold information for requests from each processing element attached to it, including central processors (CPs), I/O adapter mechanisms, and any remote storage controllers, which are set when a request is received by the storage controller mechanism, and reset when the storage controller mechanism has completed execution of the request, and said deadlock avoiding mechanism monitor logic monitors valid bits of request registers within the storage controller, said valid bits for these registers being set when the request is received by the storage controller mechanism, and reset when execution of the request is complete.

4. A symmetric multiprocessor system according to claim 3, wherein said internal hang detection logic which generates an internal hang detect pulse becomes active for one cycle at a fixed time interval which is a time interval subset of a time interval for the global hang detection logic pulse which is used to detect a global hang pulse within the storage controller.

5. A symmetric multiprocessor system according to claim 4, wherein said monitor logic which monitors the request register valid bits also monitors the internal hang detect pulse, and when a request register bit is valid continuously throughout an interval where two internal hang detect pulses occur, an internal hang detect latch mechanism is set, indicating that there is a potential deadlock condition, and as a result, an internal hang detect output signal is set.

6. A symmetric multiprocessor system according to claim 5, wherein said deadlock resolution logic includes control logic for each request type to monitor the internal hang detect output signal, and to take appropriate action when the signal is active, to decide whether each specific request has already been granted priority and made a pipeline pass at least once, and if so, an internal hang detect output signal is ignored by said control logic for that request, but if not, the processing of the request is interrupted and it is held in an inactive state until all requests in progress will complete, and all new requests will be in a held state allowing a request which which caused detection of the internal hang to complete and to reset its valid bit, which will reset said internal hang detect latch and said internal hang detect output signal.

7. A symmetric multiprocessor system according to claim 6, wherein once the internal hang detect output signal is reset, all valid requests are released and are eligible to compete for priority.

8. A symmetric multiprocessor system according to claim 6, wherein internal hang detect latches may be set independently for multiple requests whereupon an internal hang detect output signal sent to the control logic to remain active for as long as any internal hang detect latch is set, and once all requests in progress have completed, and new requests are in a held state, all requests which have detected an internal hang will complete, the internal hang detect output signal will be reset, and all valid requests will be released from the held state and will compete for priority.

9. A symmetric multiprocessor system according to claim 8, wherein said internal hang detect output signal is only kept active for one interval between internal hang detect pulses, and the signal changes state whenever an internal hang detect pulse is received.

10. A symmetric multiprocessor system according to claim 4, wherein said control logic includes disable latches provided to allow the internal hang detect pulse to be ignored for a specific category of requests, and if the disable latch is set, said internal hang detect latch mechanism will not be set for any associated group of requests.

11. A symmetric multiprocessor system according to claim 1, wherein said internal hang detect pulse period is programmable.

12. A symmetric multiprocessor system according to claim 1, wherein said global hang pulse, from which the internal hang detect pulse is derived, can be varied in length, and a "short hang detect pulse" is generated based on the global hang pulse, and depending upon the length setting, a specified number of short hang detect pulses occur within one global hang pulse interval.

13. A symmetric multiprocessor system according to claim 1, wherein a count is made of the short hang detect pulses until the count matches a fixed value register, and at that time, an internal hang detect pulse is generated.

14. A symmetric multiprocessor system according to claim 1, wherein setting the fixed value register to all 0's disables the generation of the internal hang detect pulse, and therefore disables the deadlock resolution logic.

15. A symmetric multiprocessor system according to claim 1, wherein internal hang detect latches are set for multiple requests, and an internal hang detect output signal is generated when any internal hang detect latch is on.

16. A symmetric multiprocessor system according to claim 1, wherein a disable latch is provided to prevent the setting of an internal hang detect latch for any specific category of request, those categories being CP fetches, CP stores, I/O adapter requests, and remote SC requests.

17. A symmetric multiprocessor system according to claim 1, wherein is provided a toggle latch used to change the state of the internal hang detect output signal each time an internal hang pulse is received.

18. A symmetric multiprocessor system according to claim 1, wherein there are a plurality of storage controllers (SC) for said storage controller mechanism.

19. A symmetric multiprocessor system according to claim 1, wherein is included registers to hold information for requests from each of the attached CP's, I/O adapters, and a remote SC, which are set when the request is received by the SC, and reset when the SC has completed execution of the request.

20. A symmetric multiprocessor system according to claim 1, wherein is included Line Fetch Address Register (LFAR) logic for processing fetch requests from the SC to the main store, and Line Store Address Register (LSAR) logic for processing store requests from the SC to the main store.

21. A symmetric multiprocessor system according to claim 1, wherein is included pre-priority logic for selecting one out of all possible valid requests in a given category, said categories being: CP fetches, CP stores, I/O adapter requests, remote SC requests, and LFAR/LSAR requests.

22. A symmetric multiprocessor system according to claim 1, wherein is included overall priority logic for selecting at most two requests, one per pipeline, from the pre-priority logic stations in a given cycle, request processing logic to control the processing of CP fetches, CP stores, I/O adapter requests, remote SC requests, LFAR requests, and LSAR requests, including a mechanism to interrupt the processing of a request, and keep it in a held state until a specific condition is satisfied, and then to allow the request to resume processing.

23. A symmetric multiprocessor system according to claim 1, wherein a global hang pulse is generated at an interval used to detect hangs in the storage controller, that interval being settable.

24. A symmetric multiprocessor system according to claim 1, wherein a frequency divider is provided to generate a short hang detect pulse from the global hang pulse, causing said short hang detect pulse to occur several times within one global hang pulse period, the number of times being settable.

25. A symmetric multiprocessor system according to claim 1, wherein a counter mechanism is provided to count short hang detect pulses, to compare that count with a limiter value, and to generate an internal hang detect pulse when the number of short hang detect pulses matches the limiter value, the limiter value being settable.

26. A symmetric multiprocessor system according to claim 1, wherein monitor logic monitors the internal hang detect pulse, as well as a valid indicator for each request, and sets an internal hang detect latch for any request which remains valid continuously during the interval between two internal hang detect pulses, and resets said internal hang detect latch for any request which remains when the request completes.

27. A symmetric multiprocessor system according to claim 1, wherein is included a signalling mechanism to broadcast an internal hang detect output signal if the internal hang detect latch is set for any request.

28. A symmetric multiprocessor system according to claim 1, wherein a signal to ignore the internal hang latch allows the control logic for a specific request to remember that a pipeline pass has been made and the internal hang detect output signal was off, and to use this information to ignore the internal hang detect output signal on future pipeline passes.

* * * * *